(12) United States Patent
Smith

(10) Patent No.: US 8,783,098 B2
(45) Date of Patent: Jul. 22, 2014

(54) WIND TUNNEL MODEL MEASURING SYSTEM AND METHOD

(75) Inventor: Clayton A. Smith, Everett, WA (US)

(73) Assignee: The Boeing Company, Chicago, IL (US)

( * ) Notice: Subject to any disclaimer, the term of this patent is extended or adjusted under 35 U.S.C. 154(b) by 260 days.

(21) Appl. No.: 13/471,386

(22) Filed: May 14, 2012

(65) Prior Publication Data
US 2013/0298659 A1 Nov. 14, 2013

(51) Int. Cl.
G01M 9/00 (2006.01)

(52) U.S. Cl.
USPC .......................................................... 73/147

(58) Field of Classification Search
None
See application file for complete search history.

(56) References Cited

U.S. PATENT DOCUMENTS

| | | |
|---|---|---|
| 4,953,397 A | 9/1990 | Burton |
| 5,627,312 A | 5/1997 | Krynytzky |
| 6,615,652 B1 | 9/2003 | Bechstein et al. |
| 7,127,942 B2 * | 10/2006 | Gibson ............................ 73/147 |
| 7,254,998 B2 * | 8/2007 | Rueger ............................. 73/147 |
| 7,958,780 B2 * | 6/2011 | Corder et al. .................... 73/147 |
| 7,997,130 B1 | 8/2011 | Stonner et al. |
| 8,155,794 B2 * | 4/2012 | Mangalam et al. ........... 700/282 |

* cited by examiner

Primary Examiner — Lisa Caputo
Assistant Examiner — Jermaine Jenkins

(57) ABSTRACT

There is provided a wind tunnel model measuring system for use with a wind tunnel. The system has a measuring assembly with an automated movable structure with at least one measuring device mounted thereon and configured for placement within the wind tunnel, and a measuring controller device located outside the wind tunnel to control the automated movable structure in order to remotely move the automated movable structure from a storage position within the wind tunnel to one or more operating positions with respect to a wind tunnel model within the wind tunnel and to allow the at least one measuring device to determine a relative position of at least one movable first component with respect to a second component, both of the wind tunnel model. The system further has a processing device configured for placement outside the wind tunnel and coupled to the measuring controller device.

24 Claims, 11 Drawing Sheets

WIND TUNNEL MODEL MEASURING SYSTEM AND METHOD

BACKGROUND

1) Field of the Disclosure

The disclosure relates generally to systems and methods for wind tunnel testing, and more particularly, to systems and methods for automated wind tunnel testing for aircraft wind tunnel models.

2) Description of Related Art

A wind tunnel may be used to test aerodynamic surfaces of a small scale wind tunnel model, such as a small scale aircraft model or an aircraft part. The small scale wind tunnel model is typically secured within the wind tunnel while air moves past it to simulate the same flight conditions a full-sized aircraft would encounter in flight. Measurements which would be difficult or impossible to take while a full-sized aircraft is in flight may be easily and safely taken with wind tunnel testing of small scale wind tunnel models. By taking accurate measurements of the aerodynamic forces on the small scale wind tunnel model, one may predict the forces on a full-sized aircraft. The measurements and data obtained from wind tunnel testing of small scale wind tunnel models allow aircraft manufacturers to better understand and improve the performance of a full-sized aircraft.

Known hard tooling and measurement devices for wind tunnel model measurement exist. However, such known hard tooling and measurement devices may require wind tunnel access, wind tunnel model changes, and hand recorded documentation, all which may result in lengthy wind tunnel down time. Such lengthy wind tunnel down time may, in turn, increase the wind tunnel testing time and may result in increased costs of testing.

In addition, known automated measuring devices exist for wind tunnel model measurement. Such known automated devices move and measure themselves with internal circuitry. However, such known automated measuring devices may be costly and complicated to fit on the wind tunnel model or within the wind tunnel. During wind tunnel testing, numerous of such automated measuring devices, e.g., 80 or more, may need to be attached to the aircraft wind tunnel model in order to measure different moving parts of the aircraft wind tunnel model. However, for example, the wing tip of an aircraft wind tunnel model may only be about an inch thick and fitting several or more automated measuring devices to the wing tip may be difficult.

In addition to the increased costs that may be associated with such known hard tooling and measurement devices and such known automated measuring devices, those performing the wind tunnel testing measurements may misuse the tools, may record incorrect measurements, or may fail to record certain measurements.

Accordingly, there is a need in the art for an improved wind tunnel model measuring system and method that provide advantages over known devices, systems and methods.

SUMMARY

This need for an improved wind tunnel model measuring system and method is satisfied. As discussed in the below detailed description, embodiments of such improved system and method may provide significant advantages over existing devices, systems and methods.

In one embodiment there is provided a wind tunnel model measuring system for use with a wind tunnel. The wind tunnel model measuring system comprises a measuring assembly. The measuring assembly comprises an automated movable structure with at least one measuring device mounted thereon and configured for placement within the wind tunnel. The measuring assembly further comprises a measuring controller device located outside the wind tunnel to control the automated movable structure in order to remotely move the automated movable structure from a storage position within the wind tunnel to one or more operating positions with respect to a wind tunnel model within the wind tunnel and to allow the at least one measuring device to determine a relative position of at least one movable first component of the wind tunnel model with respect to a second component of the wind tunnel model. The wind tunnel model measuring system further comprises a processing device configured for placement outside the wind tunnel and coupled to the measuring controller device.

In another embodiment there is provided a wind tunnel incorporating a wind tunnel model measuring system. The wind tunnel comprises a plurality of walls defining a wind tunnel structure, and at least one of the plurality of walls defining a closet portion. The wind tunnel further comprises a motorized fan mounted within a fan portion of the wind tunnel structure. The wind tunnel further comprises a wind tunnel model measuring system with a measuring assembly. The measuring assembly comprises an automated movable structure with at least one measuring device mounted thereon and configured for placement within the wind tunnel. The measuring assembly further comprises a measuring controller device located outside the wind tunnel to control the automated movable structure in order to remotely move the automated movable structure from a storage position within the closet portion of the wind tunnel to one or more operating positions with respect to a wind tunnel model within the wind tunnel and to allow the at least one measuring device to determine a relative position of at least one movable first component of the wind tunnel model with respect to a second component of the wind tunnel model, the second component coupled to the at least one movable first component. The wind tunnel model measuring system further comprises a computer configured for placement outside the wind tunnel and coupled to the measuring controller device to process an output of relational measurements obtained by the at least one measuring device of the at least one movable first component with respect to the second component.

In another embodiment there is provided a method for positioning and measuring wind tunnel model components within a pressurized wind tunnel. The method comprises installing in a wind tunnel, a wind tunnel model and a wind tunnel model positioning and measuring system. The wind tunnel model has at least one movable first component and a second component coupled to the at least one movable first component. The wind tunnel model positioning and measuring system comprises a positioning assembly and a measuring assembly. The measuring assembly has an automated movable structure with at least one measuring device mounted thereon. The method further comprises adjusting with the positioning assembly a relative position of the at least one movable first component with respect to the second component. The method further comprises moving within a pressurized wind tunnel the automated movable structure with the at least one measuring device, from a storage position that does not influence an air flow across the wind tunnel model, to one or more operating positions with respect to the wind tunnel model. The method further comprises measuring and verifying with the at least one measuring device the relative position of the at least one movable first component with respect to the second component.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1A:
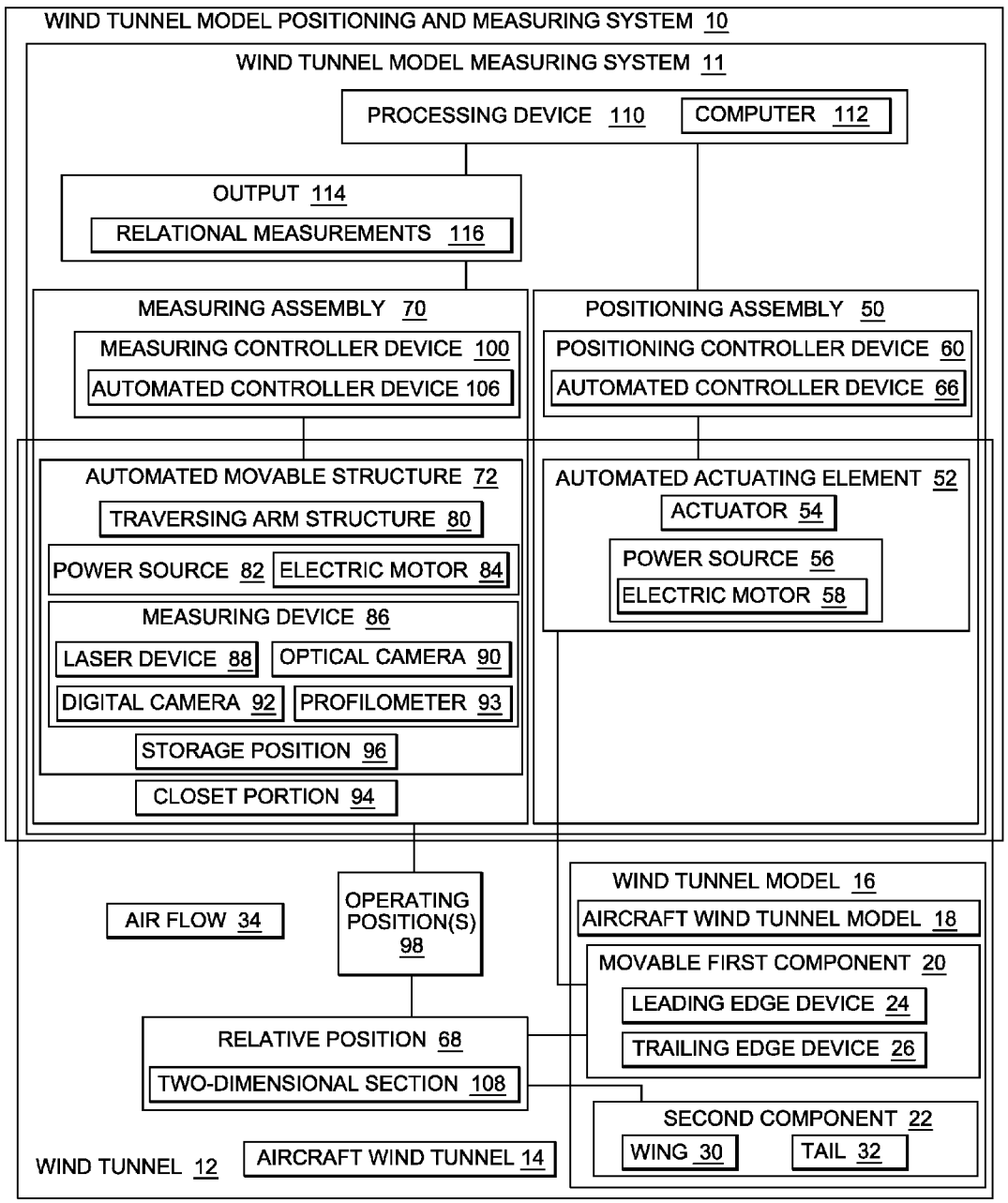
FIG. 1A is an illustration of a block diagram showing one of the embodiments of a wind tunnel model positioning and measuring system and one of the embodiments of a wind tunnel model measuring system of the disclosure.

Now referring to the Figures, FIG. 1A is an illustration of a block diagram showing one of the embodiments of a wind tunnel model positioning and measuring system 10 of the disclosure, and one of the embodiment of a wind tunnel model measuring system 11. The wind tunnel model positioning and measuring system 10 and the wind tunnel model measuring system 11 are preferably used with a wind tunnel model 16 (see FIG. 1A) in a wind tunnel 12 (see FIG. 1A). Preferably, the wind tunnel 12 comprises an aircraft wind tunnel 14 (see FIG. 1A). Preferably, the wind tunnel model 16 comprises an aircraft wind tunnel model 18 (see FIG. 1A). However, the wind tunnel 12 may also be a wind tunnel for automobiles, such as race cars, for trucks, such as semi trucks, for missiles, such as aircraft missiles, or for other suitable vehicles.

Figure 1B:
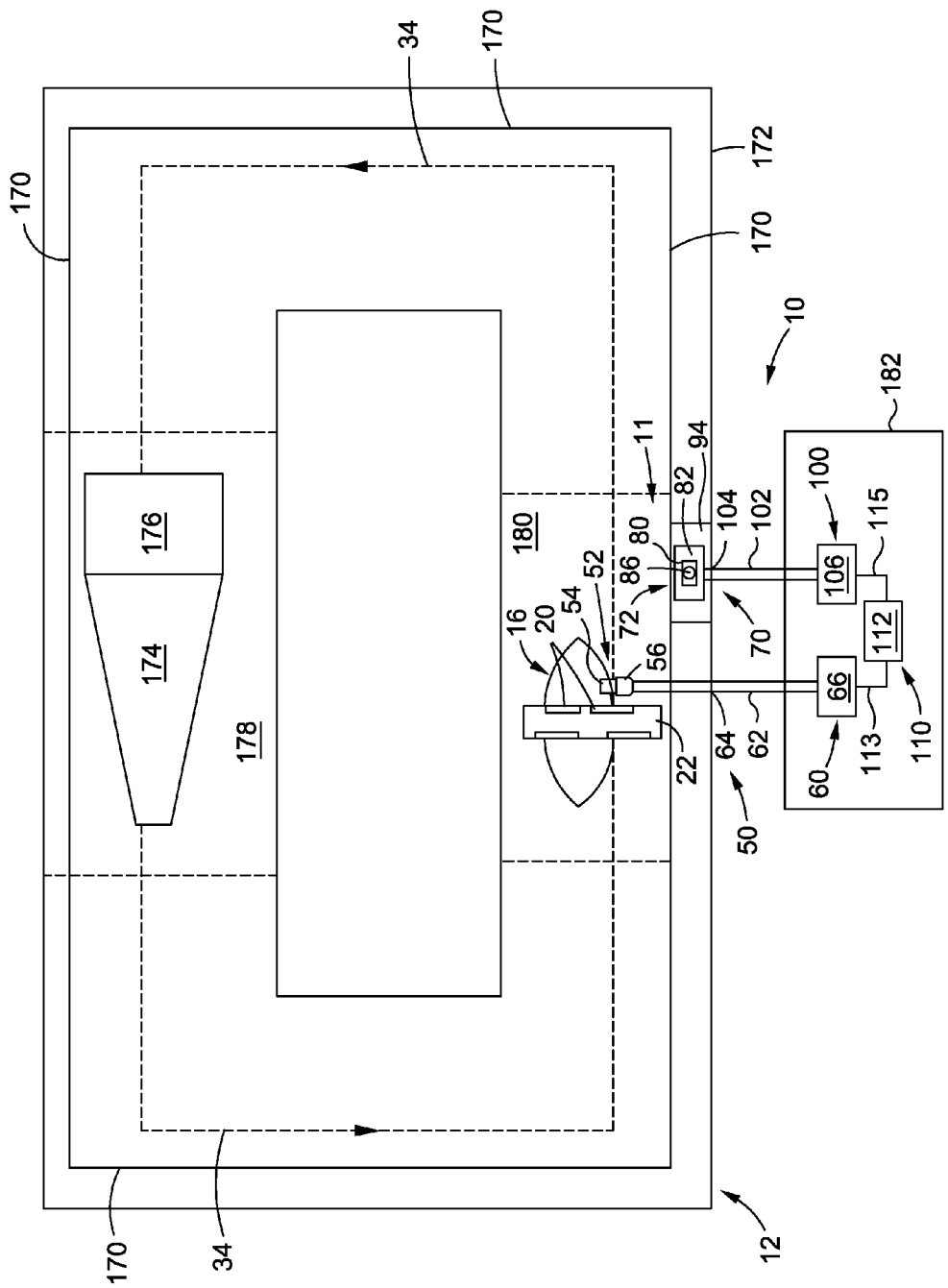
FIG. 1B is an illustration of a system diagram showing an embodiment of a wind tunnel incorporating one of the embodiments of a wind tunnel model positioning and measuring system and one of the embodiments of a wind tunnel model measuring system of the disclosure.

FIG. 1B is an illustration of a system diagram showing an embodiment of a wind tunnel 12 incorporating one of the embodiments of a wind tunnel model positioning and measuring system 10 and incorporating one of the embodiments of the wind tunnel model measuring system 11 of the disclosure. As shown in FIG. 1B, the wind tunnel 12 comprises a plurality of walls 170 defining a wind tunnel structure 172. At least one of the plurality of walls 170 defines a closet portion 94 (see FIG. 1B). The wind tunnel 12 may further comprise a motorized fan 174 with a fan motor 176 mounted within a fan portion 178 of the wind tunnel structure 172. Preferably, the wind tunnel 12 is pressurized.

As shown in FIG. 1B, the wind tunnel 12 may further comprise a wind tunnel model 16 mounted within a test portion 180 of the wind tunnel structure 172. The wind tunnel model 16 comprises at least one movable first component 20 (see FIGS. 1A, 1B) and a second component 22 (see FIGS. 1A, 1B) that may be movable or fixed. The at least one movable first component 20 is preferably coupled to the second component 22. The at least one movable first component 20 may comprise a leading edge device 24 (see FIGS. 1A, 3), a trailing edge device 26 (see FIGS. 1A, 4), or another suitable movable device on the wind tunnel model 16. The at least one movable first component 20 and the second component 22 may also comprise, for example, automobile panels, automobile tires, automobile spoilers, intake or exhaust vents, automobile and semi truck fairings, side mirrors, and other components, or other suitable components.

For purposes of this application, a leading edge device 24 means a movable part on a front portion 28 (see FIG. 2B) of a wing 30 (see FIGS. 1A, 2B) or a movable part of a tail 32 (see FIGS. 1A, 2B) on, for example, the aircraft wind tunnel model 16 (see FIG. 2B), that first contacts an air flow 34 (see FIGS. 1A, 1B) introduced through the wind tunnel 12.

Examples of leading edge devices 24 may include slats 36 (see FIGS. 2B, 5) which are aerodynamic surfaces on the leading edge device 24 that increase lift; slots 38 (see FIG. 5) which are span-wise gaps in the wing 30 that allow air flow 34 (see FIG. 1B) to flow from below the wing 30 to the upper surface of the wing 30 to reduce stall speed; leading edge flaps 40 (see FIG. 3), such as Krueger flaps 41 (see FIG. 3), which are hinged flaps that fold out from under the leading edge of the wing 30, while not forming a part of the leading edge of the wing when retracted, and which may be used to reduce speed and increase lift and drag; and extensions (not shown) which are small extensions forward of the leading edge of the leading edge device 24. The leading edge device 24 may also comprise other suitable movable parts on the front portion 28 (see FIG. 2B) of the wing 30 (see FIG. 2B) or movable parts of the tail 32 (see FIG. 2B).

Figure 3:
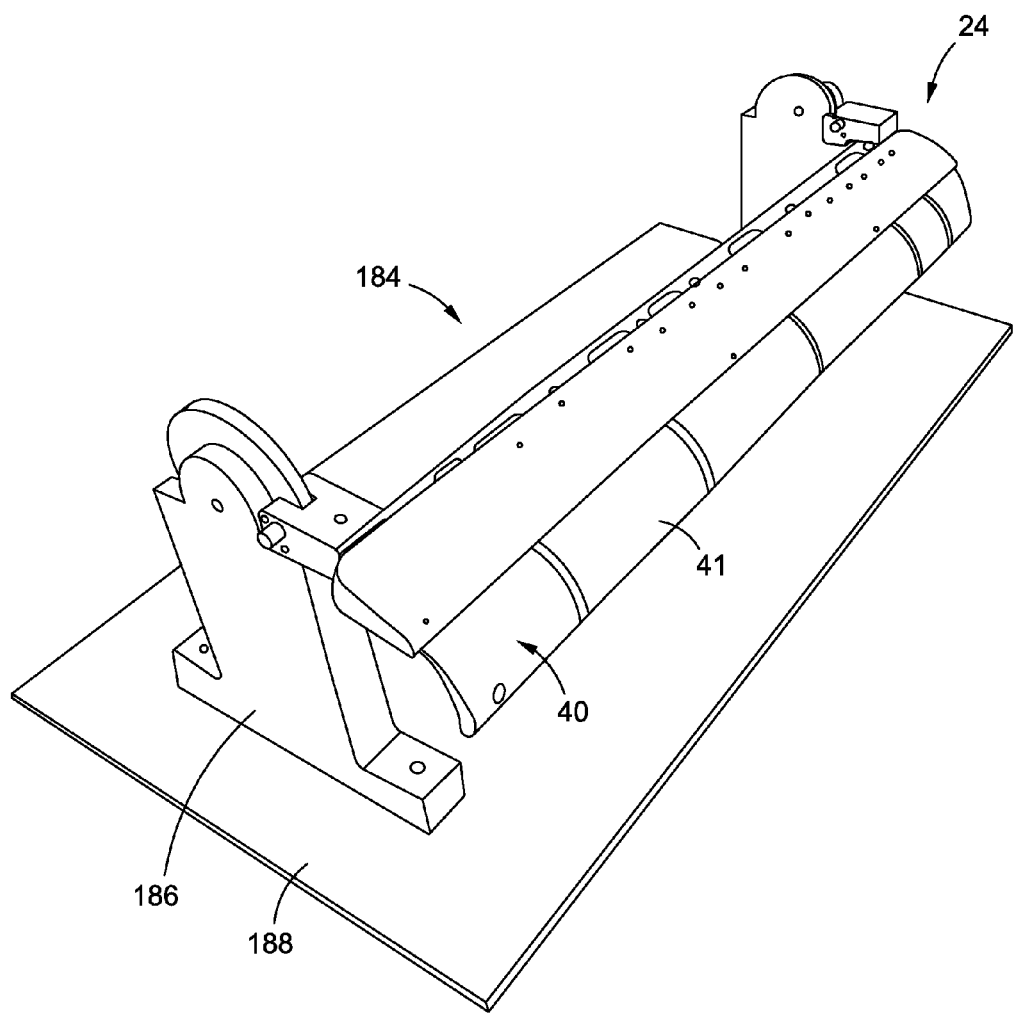
FIG. 3 is an illustration of a perspective view of one of the embodiments of a test model of a leading edge device that may be used with one of the embodiments of a wind tunnel model measuring system of the disclosure.

FIG. 3 is an illustration of a perspective view of one of the embodiments of a test model 184 of a leading edge device 24 that may be used with one of the embodiments of the wind tunnel model positioning and measuring system 10 (see FIG. 1A) of the disclosure. The test model 184 of the leading edge device 24, as shown in FIG. 3, comprises a leading edge flap 40 in the form of a Krueger flap 41. As shown in FIG. 3, the Krueger flap 41 is attached to pivot mounts 186 secured to a base plate 188.

For purposes of this application, a trailing edge device 24 means a movable part on a rear portion 42 (see FIG. 2B) of the wing 30 or the tail 32 on, for example, the aircraft wind tunnel model 16 (see FIG. 2B), where the air flow 34 separated by the leading edge device 24 rejoins. Examples of trailing edge devices 26 may include trailing edge flaps 44 (see FIG. 4), such as plain flaps, slotted flaps, Fowler flaps or other trailing edge flaps 44, which may be used to reduce speed and increase lift drag; ailerons 46 (see FIG. 2B), which are hinged flight control surfaces used to provide lateral roll and control roll; spoilers 48 (see FIG. 7) which are devices on the upper surface of the wing 30 that disrupt the air flow 34 and create drag rather than lift; and flaperons (not shown) which are a combination of a trailing edge flap 44 and an aileron 46 that work together to increase lift. The trailing edge device 26 may also comprise other suitable movable parts on the rear portion 42 of the wing 30 or the tail 32.

Figure 4:
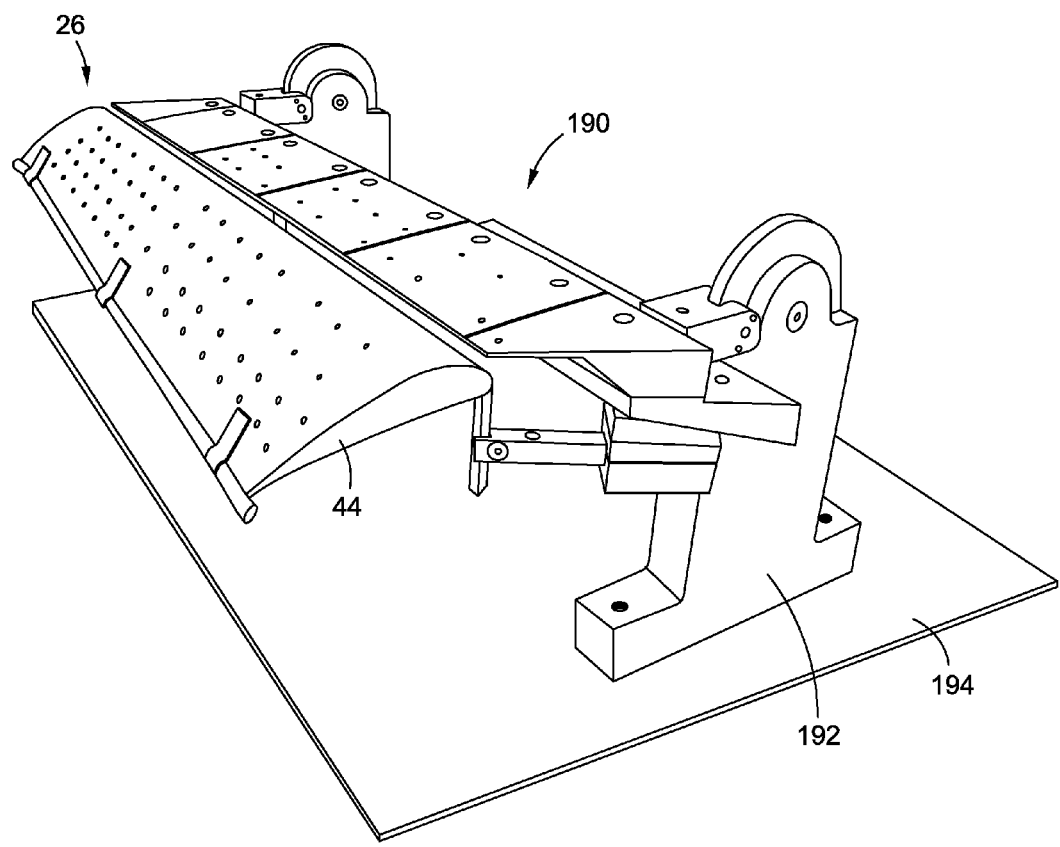
FIG. 4 is an illustration of a perspective view of one of the embodiments of a test model of a trailing edge device that may be used with one of the embodiments of a wind tunnel model measuring system of the disclosure.

FIG. 4 is an illustration of a perspective view of one of the embodiments of a test model 190 of a trailing edge device 26 that may be used with one of the embodiments of the wind tunnel model positioning and measuring system 10 (see FIG. 1A) of the disclosure. The test model 190 of the trailing edge device 26, as shown in FIG. 4, comprises a trailing edge flap 44. As shown in FIG. 4, the trailing edge flap 44 is attached to bracketed pivot mounts 192 secured to a base plate 194.

As shown in FIG. 1B, the wind tunnel 12 further comprises a wind tunnel model positioning and measuring system 10 and a wind tunnel model measuring system 11. As shown in FIG. 1A, the wind tunnel model positioning and measuring system 10 includes the wind tunnel model measuring system 11. The wind tunnel model measuring system 11 is preferably for use with a wind tunnel 12 (see FIG. 1A). In one embodiment, as shown in FIGS. 1A, 1B, the wind tunnel model measuring system 11 comprises a measuring assembly 70.

The measuring assembly 70 comprises an automated movable structure 72 (see FIGS. 1A, 1B, 2E) configured for placement within the wind tunnel 12. As shown in FIGS. 2D, 2E), the automated movable structure 72 has a first end 74, a second end 76, and an articulating body portion 78. Preferably, the automated movable structure 72 comprises a traversing arm structure 80 (see FIGS. 1A, 1B, 2D, 2E), such as a robotic traversing arm structure, or other type of automated traversing structure. The traversing arm structure 80 may provide rotation about a vertical axis, elevation out of a horizontal plane, and translation and rotary motion. This allows the traversing arm structure 80 to be capable of reaching into confined spaces.

The first end 74 of the automated movable structure 72 is preferably coupled to a power source 82 (see FIG. 1A). The automated movable structure 72 is preferably operated or powered by a power source 82 (see FIGS. 1A, 1B, 2D, 2E), such as an electric motor 84 (see FIG. 1A), or another power source 82, such as a hydraulic power source (not shown) or a pneumatic power source (not shown). The automated movable structure 72 further has at least one measuring device 86 (see FIGS. 1A, 1B, 2D, 2E) mounted thereon, preferably at the second end 76 (see FIGS. 2D, 2E). The at least one measuring device 86 may comprise a laser device 88 (see FIGS. 1A, 2E), an optical camera 90 (see FIG. 1A), a digital camera 92 (see FIG. 1A), a profilometer 93 (a measuring instrument used to measure a surface's profile in order to quantify its roughness), or another contact or non-contact device capable of obtaining contour measurements of a surface, or another suitable measuring device 86.

The automated movable structure 72 may be stored in a closet portion 94 (see FIGS. 1A, 1B) of the wind tunnel 12 or stored in another enclosed portion of the wind tunnel 12. When not in operation, the automated movable structure 72 is preferably stored in the closet portion 94 in a storage position 96 (see FIGS. 1A, 2C). The storage position 96 is configured such that the automated movable structure 72, such as in the form of traversing arm structure 80, does not influence the air flow 34 (see FIGS. 1A, 1B) across the wind tunnel model 16. When in operation, the automated movable structure 72 moves from the storage position 96 to one or more operating positions 98 (see FIGS. 1A, 2D, 2F), for example, operating position 98a (see FIG. 2E) or operating position 98b (see FIG. 2F). The automated movable structure 72 does not influence the air flow 34 (see FIG. 1B) across the wind tunnel model 16 when the automated movable structure 72 is in the storage position 96.

As further shown in FIGS. 1A, 1B, the measuring assembly 70 comprises a measuring controller device 100 located outside the wind tunnel 12. The measuring controller device 100 is coupled to the power source 82 of the automated movable structure 72 via one or more control lines 102 (see FIG. 1B), such as one or more electrical lines, connected through a wind tunnel portion 104 (see FIG. 1B), or via a wireless connection (not shown). The measuring controller device 100 may comprise an automated controller device 106 (see FIGS. 1A, 1B) having one or more of sensors, controls, instrumentation, or other components known in the art. In certain embodiments, such as, for example, a prototype system, the measuring controller device 100 may be a separate device from the positioning controller device 60. In other embodiments, such as, for example, a production system, the measuring controller device 100 may be a single, combined device with the positioning controller device 60. The measuring controller device 106 is preferably used to operate or to control the power source 82 and to operate or to control the automated movable structure 72 in order to remotely move the automated movable structure 72 from the storage position 96 (see FIG. 2C) within the wind tunnel 12, such as within a closet portion 94 (see FIGS. 1A, 1B) to the one or more operating positions 98 (see FIG. 2D) with respect to the wind tunnel model 16 within the wind tunnel 12 and to allow the at least one measuring device 86 to determine the relative position 68 (see FIG. 1A) of the at least one movable first component 20 of the wind tunnel model 16 with respect to the second component 22 of the wind tunnel model 16. The at least one measuring device 86 preferably measures a two-dimensional section 108 (see FIGS. 1A, 2E) of the relative position 68 (see FIG. 2E) of the at least one movable first component 20 (see FIG. 2E) with respect to the second component 22 (see FIG. 2E).

As further shown in FIGS. 1A, 1B, the wind tunnel model positioning and measuring system 10 and the wind tunnel model measuring system 11 further comprise a processing device 110, such as a computer 112, configured for placement outside the wind tunnel 12. As shown in FIG. 1B, the processing device 110, such as computer 112, may be coupled to the measuring controller device 100 via one or more measuring controller connection lines 115. The processing device 110, such as a computer 112, processes an output 114 (see FIGS. 1A, 1C) of relational measurements 116 (see FIGS. 1A, 1C) of the at least one movable first component 20 to the second component 22 as measured and obtained by the at least one measuring device 86. The output 114 of the relational measurements 116 that has been recorded may be automated into an electronic data file and algorithms and software may be developed and used to compute and process the relational measurements 116. Such automated processing may facilitate improved reliability, efficiency, and functionality in testing.

As shown in FIGS. 1A, 1B, the wind tunnel model positioning and measuring system 10 and the wind tunnel model measuring system 11 may further comprise a positioning assembly 50. The positioning assembly 50 comprises at least one automated actuating element 52 configured for placement within the wind tunnel 12 and operable for coupling to the at least one movable first component 20 of the wind tunnel model 16 in order to actuate or move the at least one movable first component 20. The at least one automated actuating element 52 preferably comprises an actuator 54 (see FIGS. 1A, 1B) or other suitable device for moving the at least one movable first component 20. The at least one automated actuating element 52 is preferably operated or powered by a power source 56 (see FIGS. 1A, 1B), such as an electric motor 58 (see FIG. 1A), or another power source 56 such as a hydraulic power source (not shown) or a pneumatic power source (not shown).

As further shown in FIGS. 1A, 1B, the positioning assembly 50 comprises a positioning controller device 60 configured to be located outside the wind tunnel 12. The positioning controller device 60 is operable for coupling to the at least one automated actuating element 52 via one or more control lines 62 (see FIG. 1B), such as one or more electrical lines, connected through a wind tunnel portion 64 (see FIG. 1B), or via a wireless connection (not shown) to operate or control the at least one automated actuating element 52. The positioning controller device 60 may comprise an automated controller device 66 (see FIGS. 1A, 1B) having one or more of sensors, controls, instrumentation, or other components known in the art. The positioning controller device 60 is configured to control the at least one automated actuating element 52 in order to remotely adjust the relative position 68 (see FIG. 1A) of the at least one movable first component 20 with respect to the second component 22 of the wind tunnel model 16. For example, the positioning controller device 60 may be used to remotely adjust the relative position 68 of the leading edge device 24, such as a leading edge flap 40 (see FIG. 3), to the wing 30 of the wind tunnel model 16.

As shown in FIG. 1B, the processing device 110, such as computer 112, may be coupled to the positioning controller device 60, such as the automated controller device 66 via one or more positioning controller connection lines 113. Alternatively, the wind tunnel model positioning and measuring system 10 and the wind tunnel model measuring system 11 may have one processing device 110, such as computer 112, connected to the positioning controller device 60 and another processing device 110, such as computer 112, connected to the measuring controller device 100.

Figure 1C:
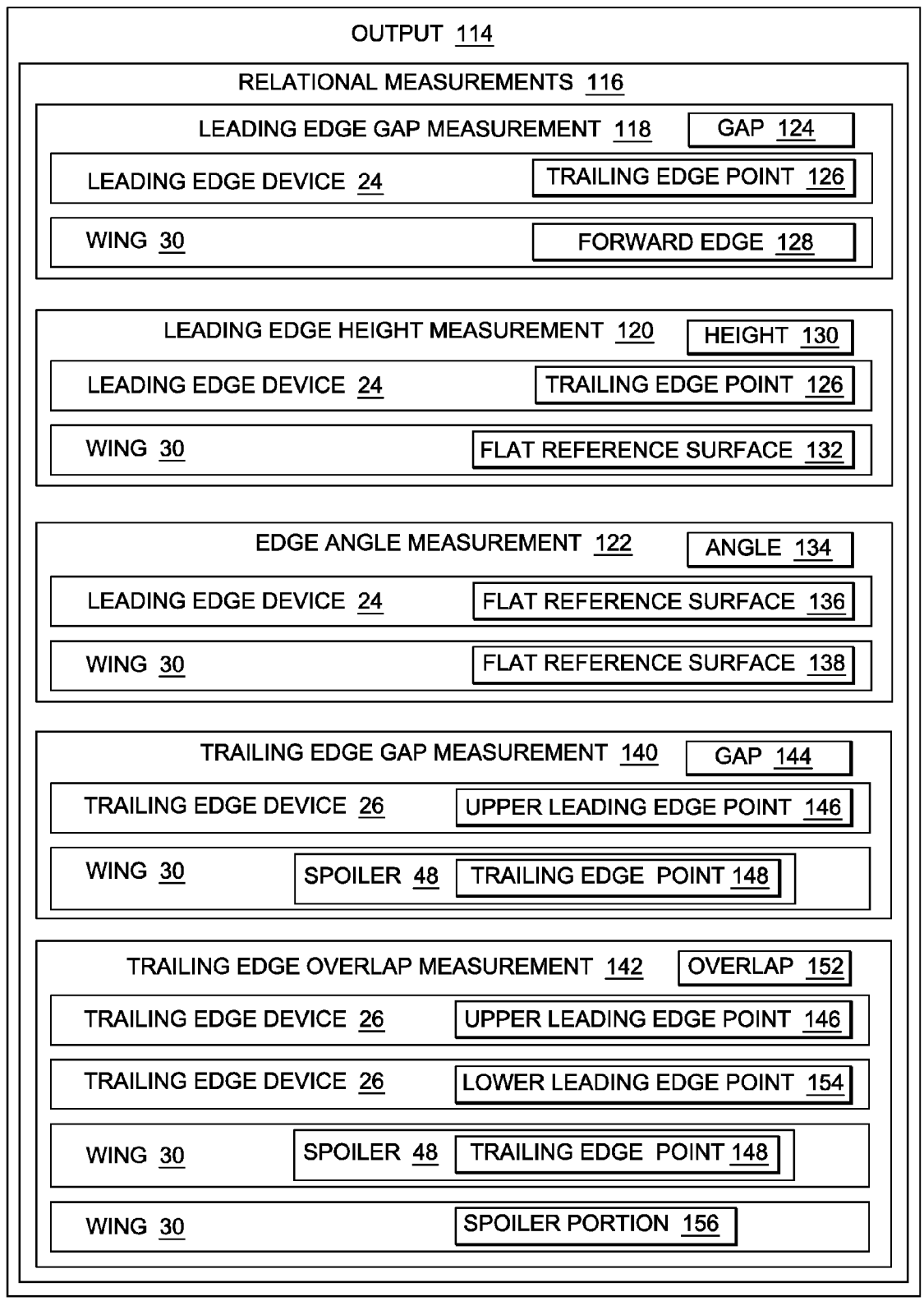
FIG. 1C is an illustration of a block diagram showing an output of relational measurements measured by one of the embodiments of a wind tunnel model measuring system of the disclosure.

FIG. 1C is an illustration of a block diagram showing the output 114 of relational measurements 116 measured by one of the embodiments of a wind tunnel model positioning and measuring system 10 or the wind tunnel model measuring system 11 of the disclosure. When the at least one movable first component 20 comprises a leading edge device 24 coupled to a wing 30 of an aircraft wind tunnel model 18, and the second component 22 is the wing 30 of the aircraft wind tunnel model 18, the at least one measuring device 86 preferably measures a leading edge gap measurement 118 (see FIGS. 1C, 5), a leading edge height measurement 120 (see FIGS. 1C, 5), and a leading edge angle measurement 122 (see FIGS. 1C, 6). When the at least one movable first component 20 comprises a trailing edge device 26 (see FIGS. 1A, 1C, 4) coupled to a wing 30 of an aircraft wind tunnel model 18, and the second component 22 is the wing 30 of the aircraft wind tunnel model 18, the at least one measuring device 86 preferably measures a trailing edge gap measurement 140 (see FIGS. 1C, 7) and a trailing edge overlap measurement 142 (see FIGS. 1C, 7).

Figure 5:
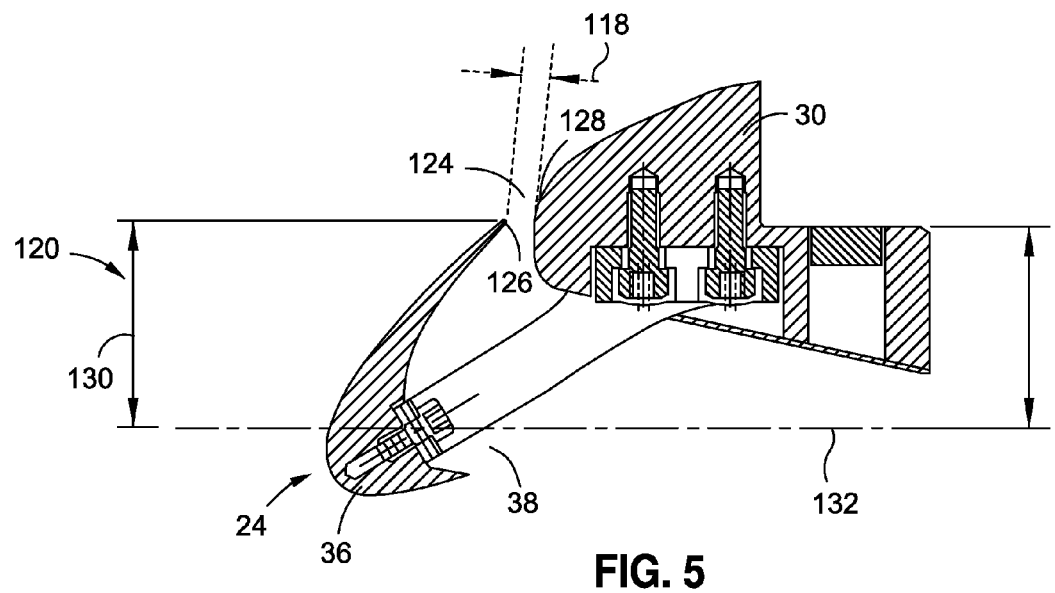
FIG. 5 is an illustration of a sectional view of one of the embodiments of a leading edge device showing a leading edge gap measurement and a leading edge height measurement.

FIG. 5 is an illustration of a sectional view of one of the embodiments of the leading edge device 24 showing the leading edge gap measurement 118 and the leading edge height measurement 120. As shown in FIG. 5, the leading edge gap measurement 118 is a measurement of a gap 124 between a trailing edge point 126 of the leading edge device 24 and a forward edge 128 of the wing 30. As further shown in FIG. 5, the leading edge height measurement 120 is a measurement of a height 130 between the trailing edge point 126 of the leading edge device 24 and a flat reference surface 132 of the wing 30.

Figure 6:
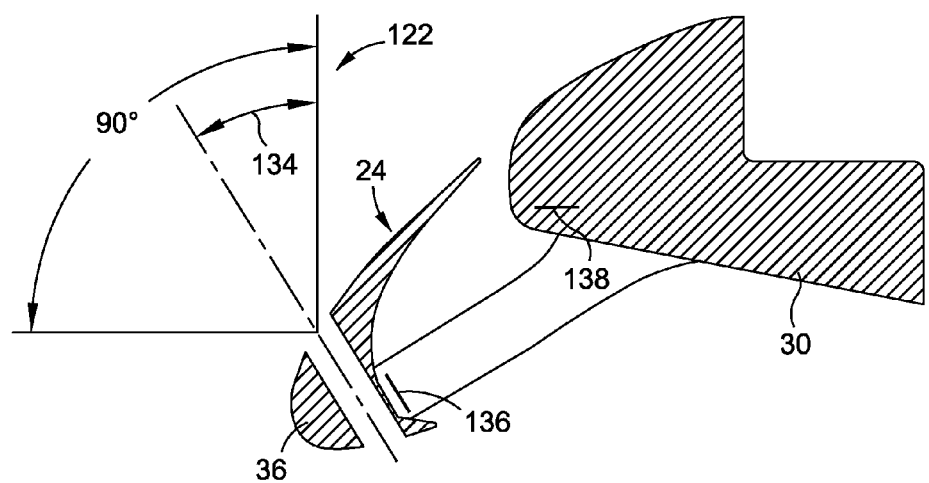
FIG. 6 is an illustration of a sectional view of one of the embodiments of a leading edge device showing a leading edge angle measurement.

FIG. 6 is an illustration of a sectional view of one of the embodiments of the leading edge device 24, in the form of a slat 36, showing the leading edge angle measurement 122. As shown in FIG. 6, the leading edge angle measurement 122 is a measurement of an angle 134 between a flat reference surface 136 of the leading edge device 24 and a flat reference surface 138 of the wing 30.

Figure 7:
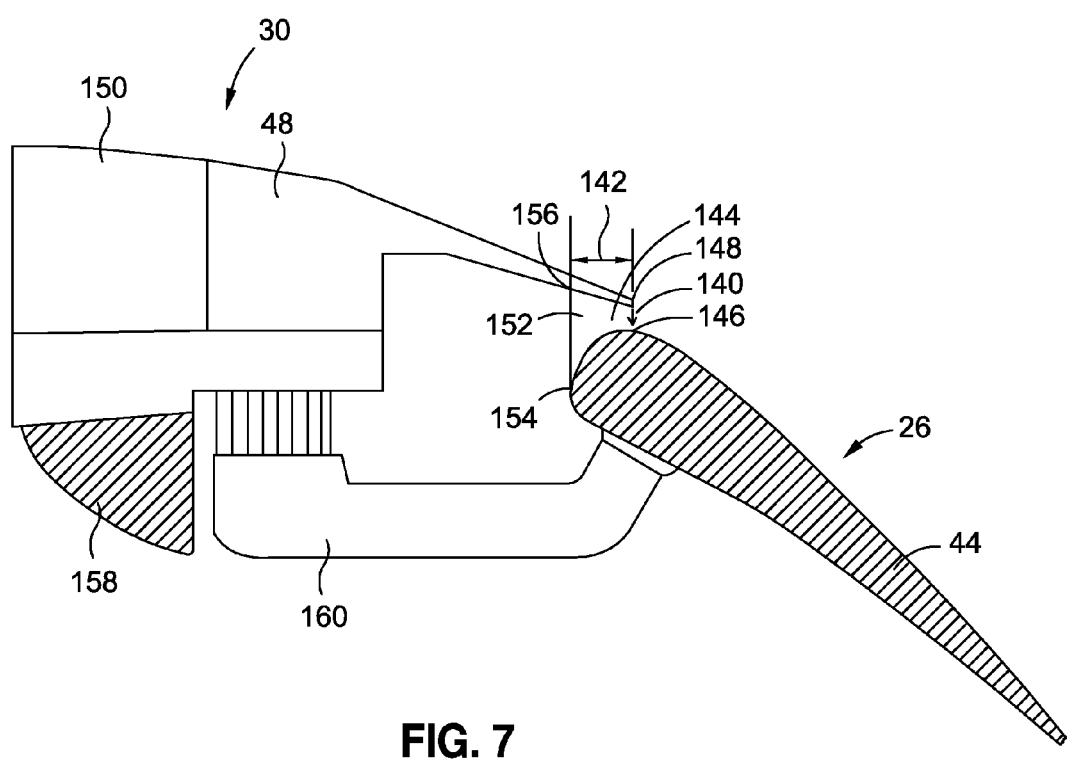
FIG. 7 is an illustration of a partial sectional view of one of the embodiments of a trailing edge device showing a trailing edge gap measurement and a trailing edge overlap measurement; and, FIG. 8 is an illustration of a flow diagram showing an embodiment of a method of the disclosure.

FIG. 7 is an illustration of a partial sectional view of one of the embodiments of the trailing edge device 26 showing the trailing edge gap measurement 140 and the trailing edge overlap measurement 142. As shown in FIG. 7, the trailing edge gap measurement 140 is a measurement of a gap 144 between an upper leading edge point 146 of the trailing edge device 26 and a trailing edge point 148 of a spoiler 48 of the wing 30. As further shown in FIG. 7, the trailing edge overlap measurement 142 is a measurement of an overlap 152 of a measurement between the upper leading edge point 146 of the trailing edge device 26 and a lower leading edge point 154 of the trailing edge device 26, and a measurement between the trailing edge point 148 of the spoiler 48 of the wing 30 and a spoiler portion 156 of the wing 30. FIG. 7 also shows the trailing edge device 26 in the form of a trailing edge flap 44. The trailing edge flap 44 is shown coupled to a bracket 160 with a fixed angle. The spoiler 48 is shown coupled to a spar 150, and the spar 150 is shown coupled to a fairing 158.

The output 114 of relational measurements 116 measured by one of the embodiments of a wind tunnel model positioning and measuring system 10 or the wind tunnel model measuring system 11 of the disclosure may also comprise relational measurements for automobiles, trucks, missiles or other vehicles. For example, the relational measurements may comprise a measurement from an automobile part or body to an automobile spoiler, a measurement from an automobile lower panel to a surface on the ground (ride height), a measurement from one or more automobile tires to an automobile fender, a measurement of gaps between automobile body panels (under wind load), a measurement of a position of semi truck fairings, side mirrors, ride height, or other components, a measurement of a deflection of an intake vent and an exhaust vent on a vehicle, a measurement of a missile design, such as a position of a missile departing from an aircraft, or another suitable relational measurement.

Figure 2A:
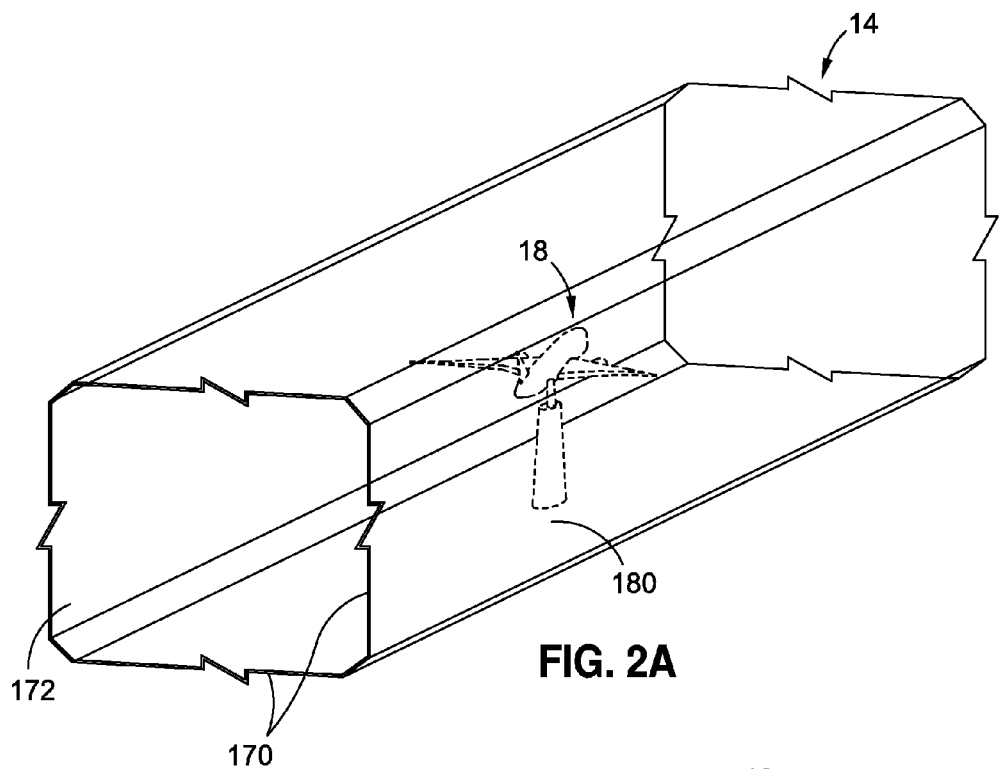
FIG. 2A is an illustration of a perspective view showing in partial an aircraft wind tunnel with an aircraft wind tunnel model mounted therein that may be used with one of the embodiments of a wind tunnel model measuring system of the disclosure.

FIG. 2A is an illustration of a perspective view showing in partial an aircraft wind tunnel 14 with an aircraft wind tunnel model 18 mounted therein that may be used with one of the embodiments of the wind tunnel model positioning and measuring system 10 and one of the embodiments of the wind tunnel model measuring system 11 of the disclosure. As shown in FIG. 2A, the aircraft wind tunnel 14 comprises a plurality of walls 170 defining a wind tunnel structure 172. The aircraft wind tunnel model 18 is located in a test portion 180 of the aircraft wind tunnel 14.

Figure 2B:
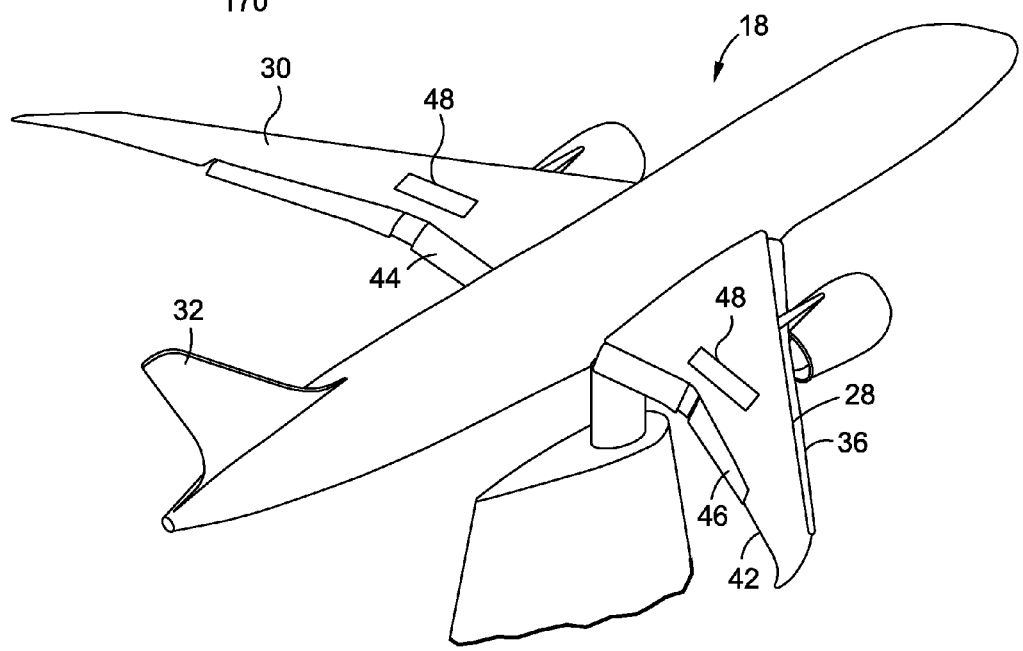
FIG. 2B is an illustration of a close-up perspective view of the aircraft wind tunnel model of FIG. 2A.

FIG. 2B is an illustration of a close-up perspective view of the aircraft wind tunnel model 18 of FIG. 2A. The aircraft wind tunnel model 18 comprises a wing 30 having a front portion 28 and a rear portion 42. The aircraft wind tunnel model 18 further comprises a tail 32. As shown in FIG. 2B, the aircraft wind tunnel model 18 further comprises slats 36 coupled to the front portion 28 of the wing 30, spoilers 48 on the upper surface of the wing 30, and trailing edge flaps 44 and ailerons 46 coupled to the rear portion 42 of the wing 30.

Figure 2C:
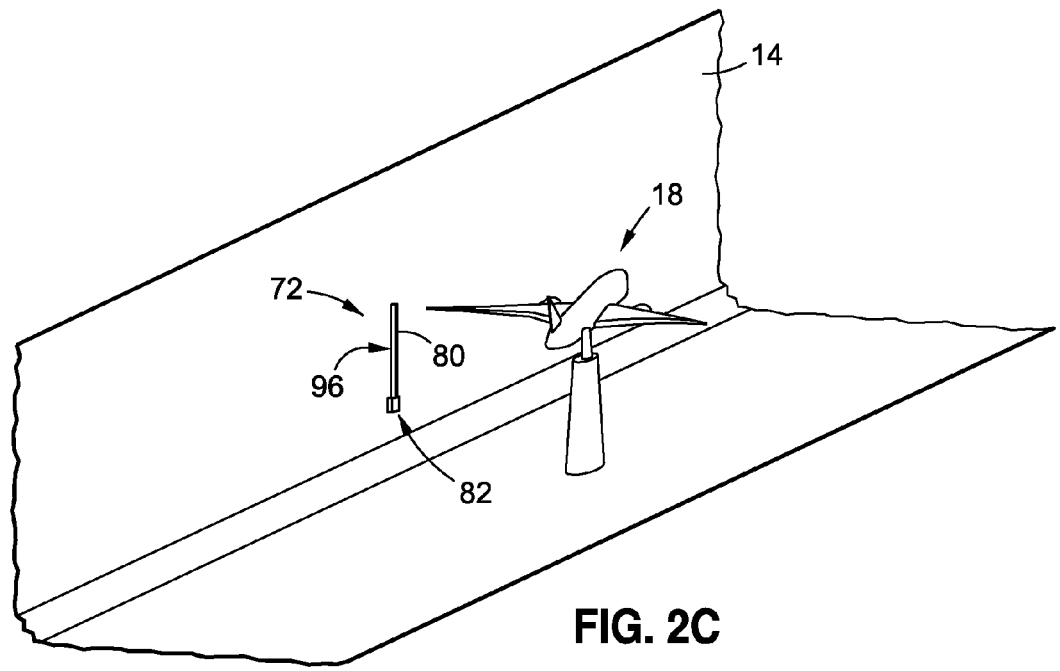
FIG. 2C is an illustration of a perspective view showing in partial the aircraft wind tunnel and the aircraft wind tunnel model of FIG. 2A with one of the embodiments of an automated movable structure of the wind tunnel model measuring system in a storage position.
Figure 2D:
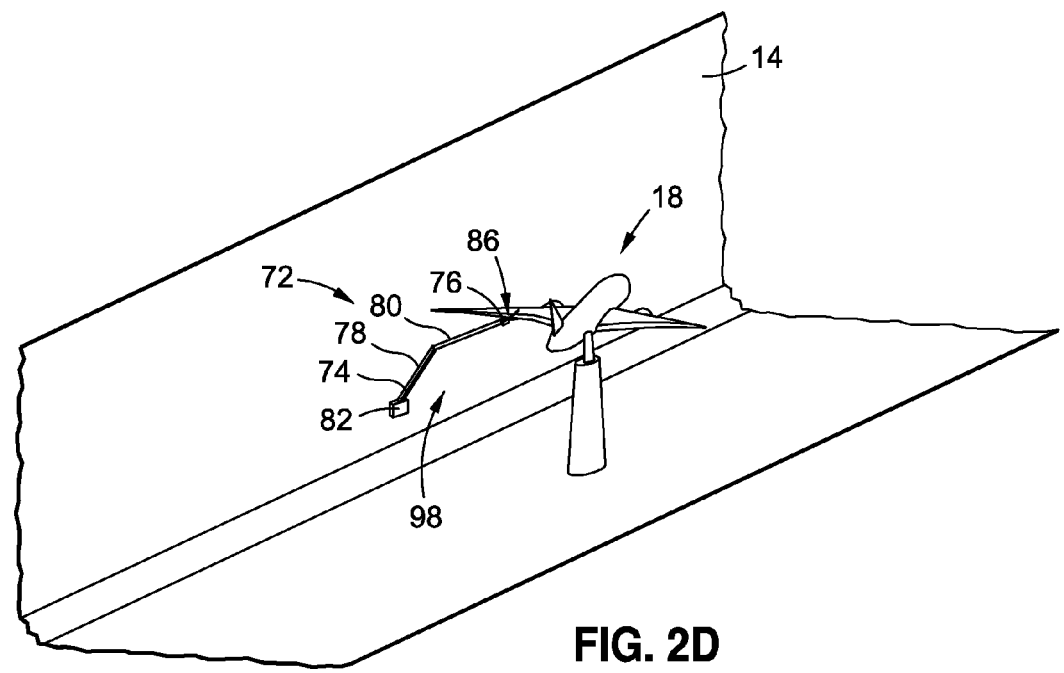
FIG. 2D is an illustration of a perspective view showing in partial the aircraft wind tunnel and the aircraft wind tunnel model of FIG. 2C with the automated movable structure in an operating position moved adjacent the aircraft wind tunnel model.
Figure 2E:
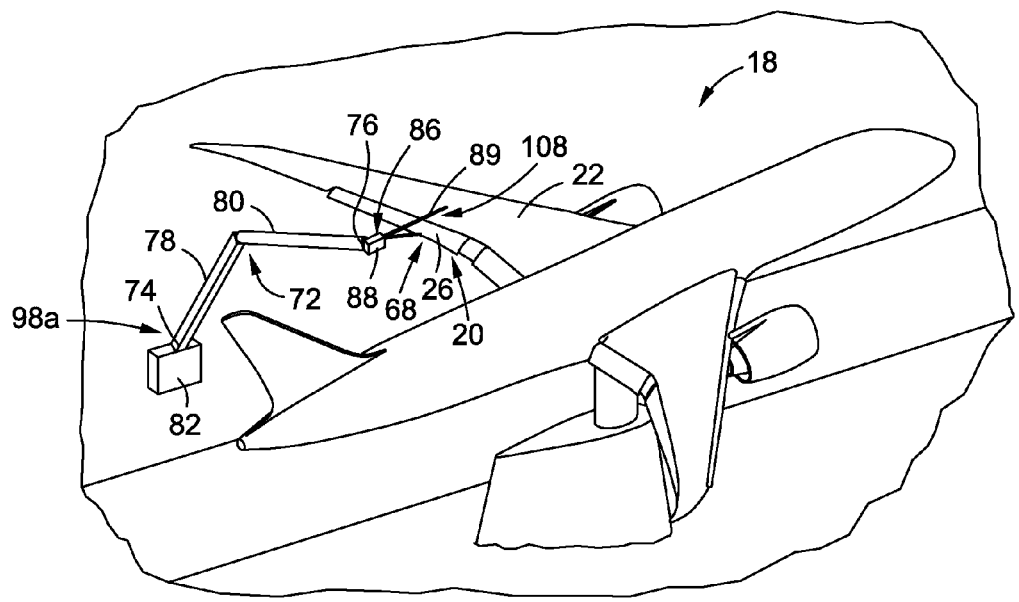
FIG. 2E is an illustration of a back perspective view showing the aircraft wind tunnel model of FIG. 2D with the automated movable structure in an operating position measuring a trailing edge device.

FIG. 2C is an illustration of a perspective view showing in partial the aircraft wind tunnel 14 and the aircraft wind tunnel model 18 of FIG. 2A with one of the embodiments of the automated movable structure 72 of the measuring assembly 70 (see FIG. 1A) of the wind tunnel model measuring system 11 (see FIG. 1A). FIG. 2C shows the automated movable structure 72 in a storage position 96 with the traversing arm structure 80 positioned upright. The traversing arm structure 80 is coupled to the power source 82.

FIG. 2D is an illustration of a perspective view showing in partial the aircraft wind tunnel 14 and the aircraft wind tunnel model 18 of FIG. 2C with the automated movable structure 72 in an operating position 98. FIG. 2D shows the first end 74, the second end 76, and the articulating body portion 78 of the traversing arm structure 80. FIG. 2D further shows the power source 82 at the first end 74 of the traversing arm structure 80 and the at least one measuring device 86 at the second end 76 of the traversing arm structure 80. FIG. 2D shows the automated movable structure 72 in an operating position 98 with the traversing arm structure 80 articulated outwardly and adjacent the aircraft wind tunnel model 18.

FIG. 2E is an illustration of a back perspective view showing the aircraft wind tunnel model 18 of FIG. 2D with the automated movable structure 72 in an operating position 98a using laser beams 89 from a laser device 88 to measure the relative position 68 of the at least one movable component 20 to the second component 22, where the at least one movable component 20 comprises a trailing edge device 26. FIG. 2E shows the first end 74, the second end 76, and the articulating body portion 78 of the traversing arm structure 80. FIG. 2E further shows the power source 82 at the first end 74 of the traversing arm structure 80 and the at least one measuring device 86 at the second end 76 of the traversing arm structure 80. FIG. 2E shows the automated movable structure 72 in an operating position 98a with the traversing arm structure 80 articulated outwardly and adjacent the aircraft wind tunnel model 18 and with the at least one measuring device 86 in the form of laser device 88 beaming laser beams 89 onto the at least one movable component 20 and the second component 22. The at least one measuring device 86 preferably measures and verifies a two-dimensional section 108 of the relative position 68 of the at least one movable component 20 to the second component 22, where the at least one movable component 20 comprises a trailing edge device 26.

Figure 2F:
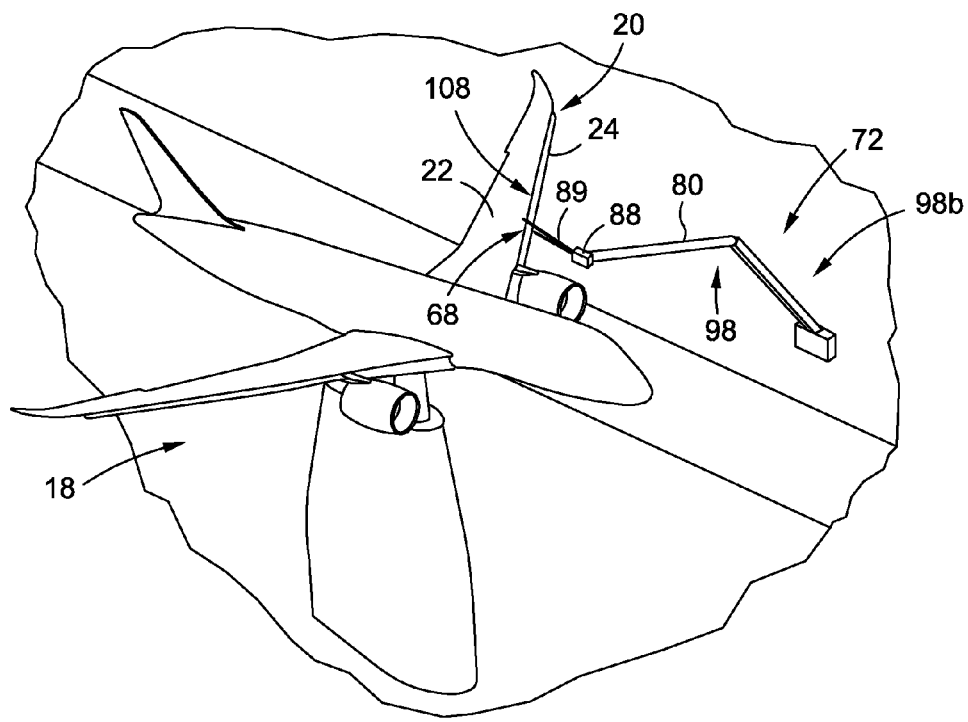
FIG. 2F is an illustration of a front perspective view showing the aircraft wind tunnel model of FIG. 2E with the automated movable structure in an operating position measuring a leading edge device.

FIG. 2F is an illustration of a front perspective view showing the aircraft wind tunnel model 18 of FIG. 2E with the automated movable structure 72 in an operating position 98b using laser beams 89 from the laser device 88 to measure the relative position of the at least one movable component 20 to the second component 22, where the at least one movable component 20 comprises a leading edge device 24. FIG. 2F shows the automated movable structure 72 in an operating position 98a with the traversing arm structure 80 articulated outwardly and adjacent the aircraft wind tunnel model 18 and with the laser device 88 beaming laser beams 89 onto the at least one movable component 20 and the second component 22. The laser device 88 preferably measures and verifies a two-dimensional section 108 of the relative position 68 of the at least one movable component 20 to the second component 22, where the at least one movable component 20 comprises a leading edge device 24.

Figure 8:
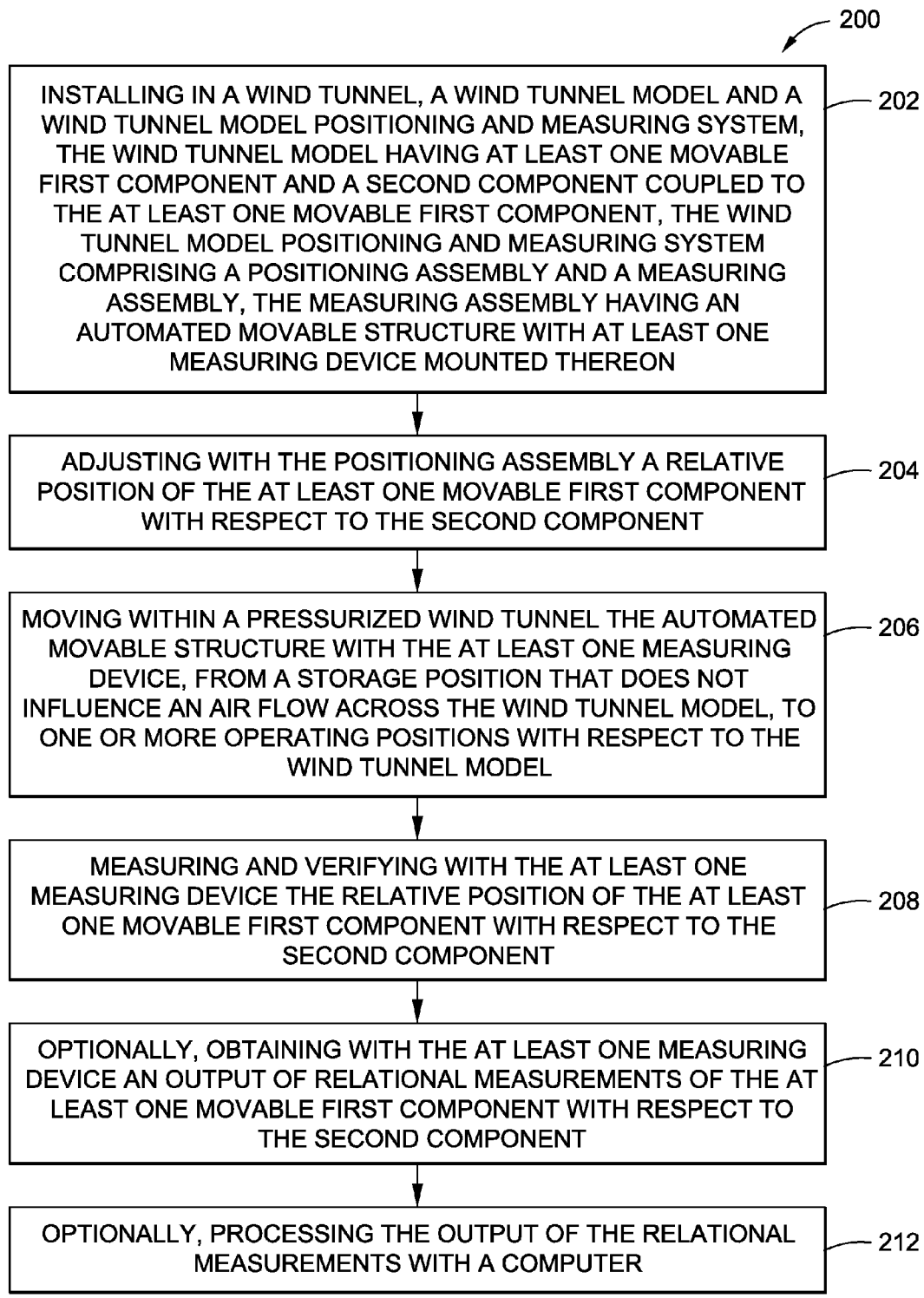

FIG. 8 is an illustration of a flow diagram showing an embodiment of a method 200 of the disclosure. As shown in FIG. 8, in another embodiment, there is provided a method 200 for positioning and measuring wind tunnel model components within a wind tunnel 12 (see FIGS. 1A, 1B) that is preferably pressurized. The method 200 comprises step 202 of installing in a wind tunnel 12 (see FIGS. 1A, 1B), a wind tunnel model 16 (see FIGS. 1A, 1B) and a wind tunnel model positioning and measuring system 10 (see FIGS. 1A, 1B).

The wind tunnel model 16 (see FIGS. 1A, 1B) has at least one movable first component 20 (see FIGS. 1A, 1B) and a second component 22 (see FIGS. 1A, 1B) coupled to the at least one movable first component 20. The wind tunnel model 16 is preferably an aircraft wind tunnel model 18 (see FIGS. 1A, 2B). The at least one movable first component 20 may comprise a leading edge device 24 (see FIGS. 1A, 5) or a trailing edge device 26 (see FIGS. 1A, 7) coupled to a wing 30 of the aircraft wind tunnel model 18. The second component 22 may comprise the wing 30 (see FIGS. 1A, 2B) or a tail 32 (see FIGS. 1A, 2B) of the aircraft wind tunnel model 18.

The wind tunnel model positioning and measuring system 10 (see FIGS. 1A, 1B) comprises a positioning assembly 50 (see FIGS. 1A, 1B) and a measuring assembly 70 (see FIGS. 1A, 1B). It should be noted that the particulars relating to the disclosed embodiment of the wind tunnel model positioning and measuring system 10, as described above, apply with equal force to the particulars of this disclosed embodiment for the method 200.

As shown in FIGS. 1A, 1B, the measuring assembly 70 comprises an automated movable structure 72 (see FIGS. 1A, 1B, 2E) with at least one measuring device 86 mounted thereon and configured for placement within the wind tunnel 12. The automated movable structure 72 comprises a traversing arm structure 80 (see FIGS. 1A, 1B, 2D), such as a robotic traversing arm structure, or other type of automated traversing structure. The automated movable structure 72 is preferably operated or powered by a power source 82 (see FIGS. 1A, 1B, 2D), such as an electric motor 84 (see FIG. 1A), or another power source 82, such as a hydraulic power source (not shown) or a pneumatic power source (not shown). The automated movable structure 72 further has at least one measuring device 86 (see FIGS. 1A, 1B, 2D, 2E) mounted thereon, preferably at the second end 76 (see FIGS. 2D, 2E).

The at least one measuring device 86 preferably comprises a laser device 88 (see FIGS. 1A, 2E), an optical camera 90 (see FIG. 1A), a digital camera 92 (see FIG. 1A), a profilometer 93 (a measuring instrument used to measure a surface's profile in order to quantify its roughness), or another contact or non-contact device capable of obtaining contour measurements of a surface, or another suitable measuring device 86.

As further shown in FIGS. 1A, 1B, the measuring assembly 70 comprises a measuring controller device 100 configured for placement outside the wind tunnel 12. The measuring controller device 100 is coupled to the power source 82 of the automated movable structure 72 and is used to operate or control the power source 82 and the automated movable structure 72 in order to remotely move the automated movable structure 72 from the storage position 96 (see FIG. 2C) within the wind tunnel 12, such as within a closet portion 94 (see FIGS. 1A, 1B) to the one or more operating positions 98 (see FIG. 2D) with respect to the wind tunnel model 16 and to allow the at least one measuring device 86 to determine the relative position 68 (see FIG. 1A of the at least one movable first component 20 to the second component 22.

As shown in FIGS. 1A, 1B, and as discussed in detail above, the positioning assembly 50 comprises at least one automated actuating element 52 (see FIGS. 1A, 1B) operable for coupling to the at least one movable first component 20 (see FIGS. 1A, 1B) in order to actuate or move the at least one movable first component 20. The at least one automated actuating element 52 preferably comprises an actuator 54 (see FIGS. 1A, 1B) or other suitable device for moving the at least one movable first component 20. The at least one automated actuating element 52 is preferably operated or powered by a power source 56 (see FIGS. 1A, 1B), such as an electric motor 58 (see FIG. 1A), or another power source 56 such as a hydraulic power source (not shown) or a pneumatic power source (not shown).

As further shown in FIGS. 1A, 1B, the positioning assembly 50 comprises a positioning controller device 60 configured to be located outside the wind tunnel 12. The positioning controller device 60 is operable for coupling to the at least one automated actuating element 52, as discussed in detail above, in order to operate or control the at least one automated actuating element 52.

As further shown in FIGS. 1A, 1B, the wind tunnel model positioning and measuring system 10 may further comprise a processing device 110, such as a computer 112, located outside the wind tunnel 12. The processing device 110, such as a computer 112, preferably processes an output 114 (see FIGS. 1A, 1C) of relational measurements 116 (see FIGS. 1A, 1C) of the at least one movable first component 20 to the second component 22 as measured and obtained by the at least one measuring device 86.

As shown in FIG. 8, the method 200 further comprises step 204 of adjusting with the positioning assembly 50 a relative position 68 (see FIGS. 1A, 2E, 2F) of the at least one movable first component 20 (see FIGS. 1A, 2E, 2F) with respect to the second component 22 (see FIGS. 1A, 2E, 2F). The step 204 of adjusting with the positioning assembly 50 further comprises operating at least one automated actuating element 52 (see FIG. 1A) coupled to the at least one movable first component 20 (see FIG. 1A) via a positioning controller device 60 (see FIG. 1A) configured to be located and placed outside the wind tunnel 12. The step 204 of adjusting with the positioning assembly 50 further comprises controlling operation of the positioning assembly 50 using a computer 112 (see FIG. 1A) configured for placement and location outside the wind tunnel 12 and coupled to the positioning controller device 60. The step 204 of adjusting with the positioning assembly 50 further comprises adjusting at least one of a leading edge device 24 (see FIG. 1A) and a trailing edge device 26 (see FIG. 1A) relative to a wing 30 (see FIG. 1A) of the aircraft wind tunnel model 18 (see FIG. 1A).

The method 200 further comprises step 206 of moving within the wind tunnel 12 that is pressurized the automated movable structure 72 with the at least one measuring device 86, from a storage position 96 (see FIGS. 1A, 2C) that does not influence an air flow 34 (see FIGS. 1A, 1B) across the wind tunnel model 16, to one or more operating positions 98 (see FIGS. 1A, 2D) with respect to the wind tunnel model 16. The positioning controller device 60 is used to remotely adjust a relative position 68 (see FIGS. 1A, 2E) of the at least one movable first component 20 to the second component 22 of the wind tunnel model 16, such as in the form of the aircraft wind tunnel model 18. The step 206 of moving within the wind tunnel 12 comprising moving a traversing arm structure 80 (see FIG. 1A) using an electric motor 84 (see FIG. 1A).

The automated movable structure 72 may be stored in the closet portion 94 (see FIGS. 1A, 1B) of the wind tunnel 12 or stored in another enclosed portion of the wind tunnel 12. When not in operation, the automated movable structure 72 is preferably stored in the closet portion 94 in a storage position 96 (see FIGS. 1A, 2C) and does not influence the air flow 34 (see FIG. 1B) across the wind tunnel model 16. When in operation, the automated movable structure 72 moves from the storage position 96 to one or more operating positions 98 (see FIGS. 1A, 2D, 2F), for example, operating position 98*a* (see FIG. 2E) or operating position 98*b* (see FIG. 2F).

The method 200 further comprises step 208 of measuring and verifying with the at least one measuring device 86 (see FIGS. 1A, 2D, 2E) the relative position 68 (see FIGS. 2E, 2F) of the at least one movable first component 20 with respect to the second component 22. The step 208 of measuring and verifying with the at least one measuring device 86 comprises preferably measuring a two-dimensional section 108 (see FIGS. 1A, 2E, 2F) of the relative position 68 (see FIGS. 1A, 2E, 2F) of the at least one movable first component 20 (see FIGS. 1A, 2E, 2F) with respect to the second component 22(see FIGS. 1A, 2E, 2F) without depressurization of the wind tunnel 12. The step 208 of measuring and verifying further comprises measuring and verifying using at least one of a laser 88 (see FIG. 1A), an optical camera 90 (see FIG. 1A), a digital camera 92 (see FIG. 1A), a profilometer 93 (a measuring instrument used to measure a surface's profile in order to quantify its roughness), or another contact or non-contact device capable of obtaining contour measurements of a surface, or another suitable measuring device 86.

The method 200 may further comprise optional step 210 of obtaining with the at least one measuring device 86 an output 114 (see FIGS. 1A,1C) of relational measurements 116 (see FIGS. 1A, 1C) of the at least one movable first component 20 with respect to the second component 22. The step 210 of obtaining with the at least one measuring device 86 an output 114 (see FIGS. 1A,1C) of relational measurements 116 may comprise receiving at least one of a leading edge gap measurement 118 between a trailing edge point 126 of a leading edge device 24 and a forward edge 128 of a wing 30, a leading edge height measurement 120 between the trailing edge point 126 of the leading edge device 24 and a flat reference surface 132 of the wing 30, a leading edge angle measurement 122 between a flat reference surface 136 of a leading edge device 24 and a flat reference surface 138 of the wing 30, a trailing edge gap measurement between an upper leading edge point of a trailing edge device and a trailing edge point of the wing, and an overlap measurement between the upper leading edge point of the trailing edge device and a lower leading edge point of the trailing edge device.

The method 200 may further comprise optional step 212 of processing the output 114 of relational measurements 116 with a processing device 110 (see FIGS. 1A, 1B), such as a computer 112 (see FIGS. 1A, 1B).

Disclosed embodiments of the wind tunnel model positioning and measuring system 10 (see FIGS. 1A, 1B), wind tunnel model measuring system 11 (see FIGS. 1A, 1B), and the method 200 for positioning and measuring wind tunnel model components within a wind tunnel 12 (see FIGS. 1A, 1B) offer numerous advantages. They provide an automated movable structure 72 (see FIGS. 1A, 2C) with a measuring device 86 (see FIGS. 1A, 2D) mounted thereon that is movable from a storage position 96 (see FIGS. 1A, 2C) within a wind tunnel 12 (see FIGS. 1A, 1B), where it does not influence an air flow 34 (see FIGS. 1A, 1B) across a wind tunnel model 16 (see FIGS. 1A, 1B), to one or more operating positions 98 (see FIGS. 1A, 2D) that allow the measuring device 86 to determine a relative position 68 (see FIGS. 1A, 2E) of various components of the wind tunnel model 16, such as a leading edge device 24 (see FIGS. 1A, 2F) to a wing 30 (see FIGS. 1A, 2F) or a trailing edge device 26 (see FIGS. 1A, 2E) to a wing 30 during a wind tunnel test. Disclosed embodiments of the wind tunnel model positioning and measuring system 10 (see FIGS. 1A, 1B), wind tunnel model measuring system 11 (see FIGS. 1A, 1B), and the method 200 for positioning and measuring wind tunnel model components within a wind tunnel 12 (see FIGS. 1A, 1B) further provide in one embodiment a traversing arm structure 80 (see FIGS. 1A, 2E) with a laser device 88 (see FIGS. 1A, 2E) which measures a two-dimensional section 108 (see FIGS. 1A, 2E) of the wind tunnel model components, such as the leading edge device 24 (see FIGS. 1A, 2F) to the wing 30 (see FIGS. 1A, 2F) or the trailing edge device 26 (see FIGS. 1A, 2E) to the wing 30 without depressurization of the wind tunnel 12. Thus, disclosed embodiments of the wind tunnel model positioning and measuring system 10 (see FIGS. 1A, 1B), the wind tunnel model measuring system 11 (see FIGS. 1A, 1B), and the method 200 for positioning and measuring wind tunnel model components within a wind tunnel 12 (see FIGS. 1A, 1B) allow automated electronic measurement of the wind tunnel model components, while allowing the wind tunnel 12 to remain pressurized and running.

In addition, disclosed embodiments of the wind tunnel model positioning and measuring system 10 (see FIGS. 1A, 1B), wind tunnel model measuring system 11 (see FIGS. 1A, 1B), and the method 200 for positioning and measuring wind tunnel model components within a wind tunnel 12 (see FIGS. 1A, 1B) avoid the use of manual tooling, manual placement on the wind tunnel model 16 of numerous electronic or automated devices with internal circuitry in each device, and manually recorded documentation, which in turn, may reduce wind tunnel test time and may thus reduce costs of testing. Moreover, by eliminating the use of known electronic or automated devices with internal circuitry, which can be costly and complicated to fit within the wind tunnel model 16, with the wind tunnel model positioning and measuring system 10, the wind tunnel model measuring system 11 (see FIGS. 1A, 1B), and the method 200, only one measurement system is needed and thus wind tunnel testing time and down time are reduced and overall costs of testing may be reduced. In addition, disclosed embodiments of the wind tunnel model positioning and measuring system 10, the wind tunnel model measuring system 11 (see FIGS. 1A, 1B), and the method 200 minimize or eliminate tool misuse, incorrect recorded measurements, and failure to record measurements, which may improve the accuracy in measuring the relational measurements 116 (see FIG. 1A) of the wind tunnel model 16, and which may, in turn, result in improved reliability and efficiency in testing.

Because the wind tunnel model positioning and measuring system 10, the wind tunnel model measuring system 11 (see FIGS. 1A, 1B), and method 200 do not require costly and complex devices or equipment to be manually attached to the wind tunnel model 16, do not incur alot of down time during wind tunnel testing, and do not require manual recordation of measurements, such systems 10, 11 and method 200 may ensure that wind tunnel testing may be conducted less expensively, more quickly, and more accurately. Thus, such systems 10, 11 and method 200 provide an automated measuring assembly for measuring and verifying relational measurements of the various components of the wind tunnel model, provide an automated positioning assembly for positioning the various components of the wind tunnel model 16, and provide a processing device for easily and quickly processing the recorded measurements of the wind tunnel model.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A wind tunnel model measuring system for use with a wind tunnel, the system comprising:
   a measuring assembly comprising:
      an automated movable structure with at least one measuring device mounted thereon and configured for placement within the wind tunnel; and,
      a measuring controller device located outside the wind tunnel to control the automated movable structure in order to remotely move the automated movable structure from a storage position within the wind tunnel to one or more operating positions with respect to a wind tunnel model within the wind tunnel and to allow the at least one measuring device to determine a relative position of at least one movable first component of the wind tunnel model with respect to a second component of the wind tunnel model; and,
   a processing device configured for placement outside the wind tunnel and coupled to the measuring controller device.

2. The wind tunnel model measuring system of claim 1 further comprising a positioning assembly comprising:
   at least one automated actuating element operable for coupling to the at least one movable first component of the wind tunnel model; and,
   a positioning controller device configured to be located outside the wind tunnel and further configured to control the at least one automated actuating element in order to remotely adjust the relative position of the at least one movable first component with respect to the second component of the wind tunnel.

3. The wind tunnel model measuring system of claim 1 wherein the wind tunnel model is an aircraft wind tunnel model, and further wherein the at least one movable first component is a leading edge device coupled to a wing of the aircraft wind tunnel model and the second component is the wing of the aircraft wind tunnel model.

4. The wind tunnel model measuring system of claim 3 wherein the processing device comprises a computer that processes an output of relational measurements comprising at least one of a leading edge gap measurement between a trailing edge point of the leading edge device and a forward edge of the wing, a leading edge height measurement between the trailing edge point of the leading edge device and a flat reference surface of the wing, and a leading edge angle measurement between a flat reference surface of the leading edge device and a flat reference surface of the wing.

5. The wind tunnel model measuring system of claim 1 wherein the wind tunnel model is an aircraft wind tunnel model, and further wherein the at least one movable first component is a trailing edge device coupled to a wing of the aircraft wind tunnel model and the second component is the wing of the aircraft wind tunnel model.

6. The wind tunnel model measuring system of claim 5 wherein the processing device comprises a computer that processes an output of relational measurements comprising at least one of a trailing edge gap measurement between an upper leading edge point of the trailing edge device and a trailing edge point of a spoiler of the wing, and a trailing edge overlap measurement between the upper leading edge point of the trailing edge device and a lower leading edge point of the trailing edge device and between the trailing edge point of the spoiler of the wing and a spoiler portion of the wing.

7. The wind tunnel model measuring system of claim 1 wherein the at least one measuring device comprises at least one of a laser, an optical camera, a digital camera, and a profilometer, the at least one measuring device operable to measure a two-dimensional section of the relative position of the at least one movable first component with respect to the second component.

8. The wind tunnel model measuring system of claim 1 wherein the automated movable structure comprises a traversing arm structure operable from the storage position within the wind tunnel, the storage position configured such that the traversing arm structure does not influence an air flow across the wind tunnel model.

9. A wind tunnel incorporating a wind tunnel model measuring system, the wind tunnel comprising:
a plurality of walls defining a wind tunnel structure, and at least one of the plurality of walls defining a closet portion;
a motorized fan mounted within a fan portion of the wind tunnel structure;
a wind tunnel model measuring system having a measuring assembly, the measuring assembly comprising:
an automated movable structure with at least one measuring device mounted thereon and configured for placement within the wind tunnel; and,
a measuring controller device located outside the wind tunnel to control the automated movable structure in order to remotely move the automated movable structure from a storage position within the closet portion of the wind tunnel to one or more operating positions with respect to a wind tunnel model within the wind tunnel and to allow the at least one measuring device to determine a relative position of at least one movable first component of the wind tunnel model with respect to a second component of the wind tunnel model, the second component coupled to the at least one movable first component; and,
a computer configured for placement outside the wind tunnel and coupled to the measuring controller device to process an output of relational measurements obtained by the at least one measuring device of the at least one movable first component with respect to the second component.

10. The wind tunnel of claim 9 further comprising a positioning assembly comprising:
at least one automated actuating element operable for coupling to the at least one movable first component of the wind tunnel model; and,
a positioning controller device configured to be located outside the wind tunnel and further configured to control the at least one automated actuating element in order to remotely adjust the relative position of the at least one movable first component with respect to the second component of the wind tunnel model, the computer coupled to the positioning controller device to effect the remote adjustment.

11. The wind tunnel of claim 9 wherein the wind tunnel model is an aircraft wind tunnel model, and further wherein the at least one movable first component is a leading edge device coupled to a wing of the aircraft wind tunnel model and the second component is the wing of the aircraft wind tunnel model.

12. The wind tunnel of claim 11 wherein the output of relational measurements comprises at least one of a leading edge gap measurement between a trailing edge point of the leading edge device and a forward edge of the wing, a leading edge height measurement between the trailing edge point of the leading edge device and a flat reference surface of the wing, and a leading edge angle measurement between a flat reference surface of the leading edge device and a flat reference surface of the wing.

13. The wind tunnel of claim 9 wherein the wind tunnel model is an aircraft wind tunnel model, and further wherein the at least one movable first component is a trailing edge device coupled to a wing of an aircraft wind tunnel model and the second component is the wing of the aircraft wind tunnel model.

14. The wind tunnel of claim 13 wherein the output of relational measurements comprises at least one of a trailing edge gap measurement between an upper leading edge point of the trailing edge device and a trailing edge point of a spoiler of the wing, and a trailing edge overlap measurement between the upper leading edge point of the trailing edge device and a lower leading edge point of the trailing edge device and between the trailing edge point of the spoiler of the wing and a spoiler portion of the wing.

15. The wind tunnel of claim 9 wherein the automated movable structure comprises a traversing arm structure powered by an electric motor, the traversing arm structure movable from the storage position within the closet portion to at least one measurement position within the wind tunnel, the closet portion and the storage position configured such that the traversing arm structure does not influence an air flow across the wind tunnel model.

16. The wind tunnel of claim 9 wherein the at least one measuring device comprises at least one of a laser, an optical camera, a digital camera, and a profilometer.

17. A method for positioning and measuring wind tunnel model components within a pressurized wind tunnel, the method comprising:
installing in a wind tunnel, a wind tunnel model and a wind tunnel model positioning and measuring system, the wind tunnel model having at least one movable first component and a second component coupled to the at least one movable first component, the wind tunnel model positioning and measuring system comprising a positioning assembly and a measuring assembly, the measuring assembly having an automated movable structure with at least one measuring device mounted thereon;

adjusting with the positioning assembly a relative position of the at least one movable first component with respect to the second component;

moving within a pressurized wind tunnel the automated movable structure with the at least one measuring device, from a storage position that does not influence an air flow across the wind tunnel model, to one or more operating positions with respect to the wind tunnel model; and, measuring and verifying with the at least one measuring device the relative position of the at least one movable first component with respect to the second component.

18. The method of claim 17 further comprising obtaining with the at least one measuring device an output of relational measurements of the at least one movable first component with respect to the second component, and processing the output of relational measurements with a computer.

19. The method of claim 18 wherein obtaining with the at least one measuring device comprises receiving at least one of a leading edge gap measurement between a trailing edge point of a leading edge device and a forward edge of a wing, a leading edge height measurement between the trailing edge point of the leading edge device and a flat reference surface of the wing, a leading edge angle measurement between a flat reference surface of a leading edge device and a flat reference surface of the wing, a trailing edge gap measurement between an upper leading edge point of a trailing edge device and a trailing edge point of a spoiler of the wing, and a trailing edge overlap measurement between the upper leading edge point of the trailing edge device and a lower leading edge point of the trailing edge device and between the trailing edge point of the spoiler of the wing and a spoiler portion of the wing.

20. The method of claim 17 wherein adjusting with the positioning assembly comprises operating at least one automated actuating element coupled to the at least one movable first component via a positioning controller device configured to be located outside the wind tunnel.

21. The method of claim 20 wherein adjusting with the positioning assembly comprises controlling operation of the positioning assembly using a computer configured for placement outside the wind tunnel and coupled to the positioning controller device.

22. The method of claim 17 wherein the measuring and verifying with the at least one measuring device comprises measuring a two-dimensional section of the relative position of the at least one movable first component with respect to the second component without depressurization of the wind tunnel.

23. The method of claim 17 wherein:

moving within the pressurized wind tunnel the automated movable structure with the at least one measuring device comprises moving a traversing arm structure using an electric motor; and, measuring and verifying with the at least one measuring device comprises measuring and verifying using at least one of a laser, an optical camera, a digital camera, and a profilometer.

24. The method of claim 17 wherein adjusting with the positioning assembly comprises adjusting at least one of a leading edge device and a trailing edge device relative to a wing of an aircraft wind tunnel model.

* * * * *